United States Patent
Andrews et al.

(10) Patent No.: US 12,335,035 B2
(45) Date of Patent: Jun. 17, 2025

(54) AUTOENCODER-BASED ERROR CORRECTION CODING FOR LOW-RESOLUTION COMMUNICATION

(71) Applicant: Board of Regents, The University of Texas System, Austin, TX (US)

(72) Inventors: Jeffrey G. Andrews, Austin, TX (US); Eren Balevi, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 569 days.

(21) Appl. No.: 17/638,700

(22) PCT Filed: Aug. 26, 2020

(86) PCT No.: PCT/US2020/048010
§ 371 (c)(1),
(2) Date: Feb. 25, 2022

(87) PCT Pub. No.: WO2021/041551
PCT Pub. Date: Mar. 4, 2021

(65) Prior Publication Data
US 2022/0416937 A1    Dec. 29, 2022

Related U.S. Application Data

(60) Provisional application No. 62/891,747, filed on Aug. 26, 2019.

(51) Int. Cl.
*H04L 1/00*    (2006.01)
*G06N 3/04*    (2023.01)
(52) U.S. Cl.
CPC .............. *H04L 1/0041* (2013.01); *G06N 3/04* (2013.01); *H04L 1/0057* (2013.01)

(58) Field of Classification Search
CPC ....... H04L 1/0041; H04L 1/0057; G06N 3/04; H04B 1/0003
See application file for complete search history.

(56) References Cited

U.S. PATENT DOCUMENTS 5,966,401 A    10/1999  Kumar
6,634,009 B1 *  10/2003  Molson .................. G06F 30/30
                                                716/100
(Continued)

OTHER PUBLICATIONS

Balevi et al. "One-Bit OFDM Receivers via Deep Learning", https://arxiv.org/pdf/1811.00971, retrieved on Oct. 14, 2020, 11 pages.
(Continued)

*Primary Examiner* — Vineeta S Panwalkar
(74) *Attorney, Agent, or Firm* — Foley & Lardner LLP

(57) ABSTRACT

Various embodiments of the present technology provide a novel deep learning-based error correction coding scheme for AWGN channels under the constraint of moderate to low bit quantization (e.g., one-bit quantization) in the receiver. Some embodiments of the error correction code minimize the probability of bit error can be obtained by perfectly training a special autoencoder, in which "perfectly" refers to finding the global minima of its cost function. However, perfect training is not possible in most cases. To approach the performance of a perfectly trained autoencoder with a suboptimum training, some embodiments utilize turbo codes as an implicit regularization, i.e., using a concatenation of a turbo code and an autoencoder.

8 Claims, 8 Drawing Sheets

(56) References Cited

U.S. PATENT DOCUMENTS

| | | | |
|---|---|---|---|
| 6,751,269 B1* | 6/2004 | Shalvi | H04L 1/0041 |
| | | | 375/298 |
| 6,924,760 B1* | 8/2005 | McLeod | H03M 1/066 |
| | | | 341/172 |
| 11,615,319 B2* | 3/2023 | Venkatesh | G06N 3/063 |
| | | | 706/27 |
| 2006/0014499 A1 | 1/2006 | Gorokhov et al. | |
| 2008/0159436 A1 | 3/2008 | Cho et al. | |
| 2011/0158361 A1 | 6/2011 | Denl et al. | |
| 2016/0248610 A1 | 8/2016 | Vaman et al. | |
| 2018/0367192 A1 | 12/2018 | O'Shea et al. | |

OTHER PUBLICATIONS

International Search Report and Written Opinion corresponding to PCT/US2020/048010, 18 pages, dated Nov. 20, 2020.

* cited by examiner

AUTOENCODER-BASED ERROR CORRECTION CODING FOR LOW-RESOLUTION COMMUNICATION

CROSS REFERENCE TO RELATED APPLICATIONS

This application is a U.S. National Phase Application under 35 U.S.C. § 371 of International Application No. PCT/US2020/048010, entitled "AUTOENCODER-BASED ERROR CORRECTION CODING FOR LOW-RESOLUTION COMMUNICATION," filed Aug. 26, 2020, which claims the benefit of and priority to, U.S. provisional patent application No. 62/891,747 entitled "AUTOENCODER-BASED ERROR CORRECTION CODING FOR LOW-RESOLUTION COMMUNICATION," and filed on Aug. 26, 2019, the content of each of which is incorporated by reference for all purposes in its entirety.

TECHNICAL FIELD

Various embodiments of the present technology generally relate to error correction. More specifically, some embodiments of the present technology relate to autoencoder-based error correction coding for low resolution communication.

BACKGROUND

Wireless communication systems are trending towards ever higher carrier frequencies, due to the huge bandwidth available. These high frequencies are made operational by the use of large co-phased antenna arrays to enable directional beamforming. Digital control of these arrays is highly desirable but requires a very large number of analog-to-digital converters (ADCs) at the receiver, each of which consumes nontrivial power and implementation area. Low resolution quantization is thus inevitable to enable digital beamforming in future systems. However, little is known about techniques that ensure reliability in such a low resolution environment.

The impact of error correction codes has been enormous in terms of enabling reliable communication in the presence of noise, interference and other impairments. Most error correction codes are optimized for simple basic additive white Gaussian noise (AWGN) channels. Hence, designing an error correction code remains an open problem for more general and practical channels, including those with low resolution quantization. Even worse, there is not any known method/tool to solve this problem, because designing a code is mathematically intractable for practical channels.

SUMMARY

Various embodiments of the present technology generally relate to error correction. More specifically, some embodiments of the present technology relate to autoencoder-based error correction coding for low resolution communication. Some embodiments provide for a specifically designed channel code for the challenging low-bit (e.g., one-bit to three-bit) quantized AWGN channels via an autoencoder to obtain reliable communication at the Shannon rate.

Deep learning-based error correction codes address the reliability problem of low resolution communication without losing any significant performance by exploiting the inherent structures in received signals more effectively. This will be useful for future wireless communication systems that will employ ever-increasing number of antennas and bandwidth, in which having high resolution communication is costly. Hence, all the companies that manufacture receivers for wireless communication systems may need such kind of a solution to reduce the power consumption and hardware costs of their receivers.

Various embodiments of the present technology provide for a novel deep learning-based error correction coding scheme for AWGN channels under the constraint of one-bit quantization in the receiver. Specifically, some embodiments have an optimum error correction code that minimizes the probability of bit error can be obtained by perfectly training a special autoencoder. Perfectly in this sense refers to finding the global minima of its cost function. However, perfect training is not possible in most cases. To approach the performance of a perfectly trained autoencoder with a sub-optimum training, various embodiments utilize turbo codes as an implicit regularization, i.e., using a concatenation of a turbo code and an autoencoder. It is empirically shown that this design gives nearly the same performance as to the hypothetically perfectly trained autoencoder, and a theoretical proof is provided. Some embodiments of the proposed coding method are as bandwidth efficient as the integrated (outer) turbo code, since the autoencoder exploits the excess bandwidth from pulse shaping and packs signals more intelligently without using further bandwidth thanks to sparsity in neural networks. The presented empirical results show that the proposed coding scheme at finite block lengths outperforms conventional turbo codes even for quadrature phase shift keying (QPSK) modulation, which can achieve the Shannon bound at infinite block length. Furthermore, the proposed coding method can make one-bit complex quantization operational even for 16-QAM.

Embodiments of the present invention also include computer-readable storage media containing sets of instructions to cause one or more processors to perform the methods, variations of the methods, and other operations described herein.

Some embodiments provide for hand-crafted channel codes for low-resolution (e.g., one-bit) or moderate-resolution quantization that is transformed into learning the parameters of a specially designed autoencoder. Some embodiments use a state-of-the-art coding technique, which were developed according to the AWGN channel, as an implicit regularizer for autoencoders that are trained suboptimally. This idea is applied to design channel codes for AWGN channels under the constraint of low-resolution (e.g., one-bit) or moderate-resolution quantization in receivers.

According to at least one aspect, a transmitter in a communication system can include an encoder to receive a stream of information bits at a rate and produce an output that adds redundancy to the stream of information bits. The transmitter can include a digital modulator communicably coupled to the encoder, and configured to receive the output from the encoder and produce a set of complex symbols as output. The transmitter can include a neural network communicably coupled to the digital modulator and configured to receive the complex symbols and produce an output vector having a dimension greater than or equal to a dimension of the sets of complex symbols. The transmitter can include one or more digital to analog convertors communicably coupled to the neural network and configured to receive the output vector and produce an analog waveform to be transmitted over a communication channel.

According to at least one other aspect, a receiver can include one or more analog-to-digital converters to receive a complex baseband analog signal originating from a transmitter and representing a stream of information bits, and generate a digital signal representing a sequence of quantized signal samples. The receiver can include a neural network to process the digital signal and produce a sequence of complex data symbols as output. The sequence of quantized signal samples can have a dimension greater than or equal to a dimension of the sequence of complex data symbols. The receiver can include a demodulator to demodulate the sequence of complex data symbols produced by the neural network to produce an encoded bit stream. The receiver can include a decoder communicably coupled to the demodulator and configured to decode the encoded bit stream produced by the demodulator to produce an estimate of the stream information bits.

According to yet another aspect, a transmitter in a communication system can include an error correction encoder for adding redundancy to a stream of information bits and produce an encoded bit stream. The transmitter can include a digital modulator for generating a sequence of complex data symbols using the encoded bit stream generated by the error correction encoder. The transmitter can include a neural network that takes N complex symbols of the sequence of complex data symbols as its input, and produces a complex output vector of size G×N, where G is greater than or equal to one. The transmitter can include a waveform generator for generating, using the output vector of size G×N, a waveform for transmission over a communication channel.

According to another aspect, a method can include encoding a stream of information bits to produce a corresponding encoded bit stream, and modulating the corresponding encoded bit stream to generate a first sequence of complex data symbols. The method can include generating, using the first sequence of complex data symbols, a second sequence of complex data symbols having a dimension greater than or equal to a dimension of the first sequence of complex data symbols. The second sequence of complex data symbols can be different from the first sequence of complex data symbols. The method can include converting the second sequence of complex data symbols into an analog signal for transmission over a communication channel.

According to another aspect, a method can include converting an analog signal, originating from a transmitter and representing a stream of information bits, to a digital signal including a sequence of quantized signal samples. The method can include generating, using the sequence of quantized signal samples, a sequence of complex data symbols as output. The sequence of quantized signal samples can have a dimension greater than or equal to a dimension of the sequence of complex data symbols. The method can include demodulating the sequence of complex data symbols to generate an encoded bit stream, and decoding the encoded bit stream to generate an estimate of the stream information bits.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present technology will be described and explained through the use of the accompanying drawings.

Figure 1:
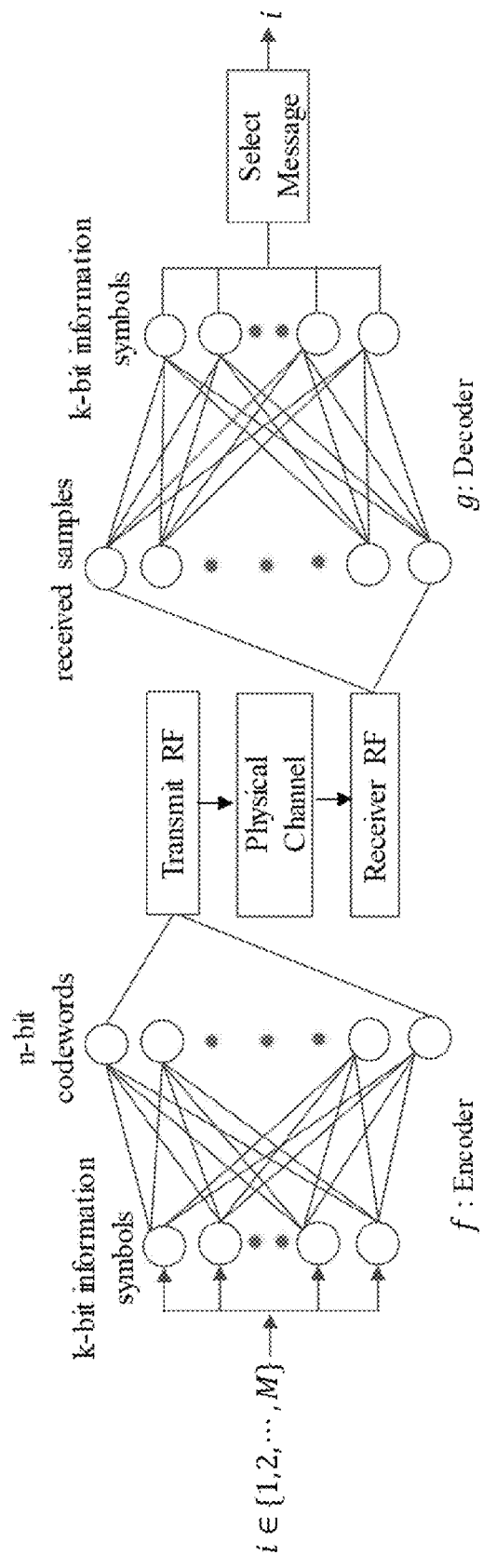
FIG. 1 illustrates an example of a channel autoencoder where the $i^{th}$ message is coded to k-bits information sequence, which is then mapped to a length-n codeword via a parameterized encoder and transferred over the channel where the received signal is processed via a parameterized decoder to extract the message i.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present disclosure generally relate to error correction. More specifically, some embodiments of the present disclosure relate to autoencoder-based error correction coding for low resolution communication. Wireless communication systems are trending towards ever higher carrier frequencies, due to the large bandwidths available. These high frequencies are made operational by the use of large co-phased antenna arrays to enable directional beamforming. Digital control of these arrays is highly desirable, but requires a very large number of analog-to-digital converters (ADCs) at the receiver or digital-to-analog converters (DACs) at the transmitter, each of which consumes nontrivial power and implementation area. Low resolution quantization is thus inevitable to enable digital beamforming in future systems. However, little is known about optimum communication techniques in a low-resolution environment.

Various embodiments of the present disclosure include error correction codes for the one-bit quantized channel, where just the sign of the real and imaginary parts is recorded by the receiver ADC. Conventional coding techniques, which mainly target unquantized additive white Gaussian noise (AWGN) channels or other idealized models, are not well-suited for this problem. Deep learning is an interesting paradigm for developing channel codes for low-resolution quantization. Various embodiments of the present technology provide a novel approach which concatenates an error correction code, such as a canonical code or a turbo code, with a deep neural network—specifically, an autoencoder to approach theoretical benchmarks and achieve compelling error probability performance. The embodiments described herein apply to communication channels with low to moderate resolution quantization including, but not limited to, one-bit quantized channels.

The impact of error correction codes has been enormous in terms of enabling reliable communication in the presence of noise, interference and other impairments. Most optimum error correction codes are optimized for simple basic additive white Gaussian noise (AWGN) channels. Hence, designing an error correction code remains an open problem for more general and practical channels, including those with low to moderate resolution quantization (e.g., from one-bit quantization to six-bit quantization). Even worse, there is not any known method/tool to solve this problem, because designing an error correction code to solve this problem is mathematically intractable for practical channels. To cope with this challenge, various embodiments described herein leverage the merits of deep learning, which does not need to a tractable mathematical formulation. As a practical channel, some embodiments consider AWGN channels under the constraint of low-resolution quantization, in which even state-of-the-art error correction codes do not perform well.

Some embodiments described herein provide a novel deep learning-based error correction coding scheme for AWGN channels under the constraint of low-resolution (e.g., one-bit to three bits) or moderate resolution (e.g., four-bits to six-bits) quantization in the receivers, in which one-bit quantization is at the extreme. Specifically, it is first shown that the optimum error correction code that minimizes the probability of bit error can be obtained by perfectly training a special autoencoder, in which "perfectly" refer to finding the global minima of its cost function.

However, perfect training is not possible in most cases. To approach the performance of a perfectly trained autoencoder with a suboptimum training, various embodiments utilize turbo codes as an implicit regularization, e.g., using a concatenation of a turbo encoder and an autoencoder (e.g., including a neural network acting as a second encoder). It is empirically shown that this design gives nearly the same performance as the hypothetically perfectly trained autoencoder. The proposed coding method is as bandwidth efficient as the integrated (outer) turbo code, since the autoencoder exploits the excess bandwidth from pulse shaping and packs signals more intelligently without using further bandwidth to sparsity in neural networks. The empirical results show that the proposed coding scheme at finite block lengths outperforms conventional turbo codes even for QPSK modulation, which can achieve the Shannon bound at infinite block length. Furthermore, some embodiments of the proposed coding method make one-bit quantization operational for 16-QAM, which is unprecedented.

Some embodiments in this disclosure leverage the merits of deep learning in developing error correction codes for challenging communication environments, such as communication receivers with low to moderate resolution quantization, while exploiting the benefits of state-of-the-art coding methods. Specifically, some embodiments provide for a hybrid code by combining an autoencoder—a deep neural network—with a state-of-the-art code. This idea of concatenating or integrating an autoencoder to one of the canonical coding methods (or other error correction code based methods) was not considered before in the literature. The proposed design brings robustness relative to the state-of-the art error correction codes, which are optimized for additive white Gaussian noise (AWGN) channels, and lead to performance loss for the channels that deviate from the AWGN channels as in the case of low-resolution quantization. Theoretical and empirical results show the efficiency of the proposed coding method for low resolution communication, which state-of-the-art codes do not perform well.

The developed error correction code solves the problem of having reliable communication under the constraint of low-resolution (or moderate-resolution) quantization in the receivers. Specifically, some embodiments allow for the Shannon rate formulated for unquantized observations to be achieved despite low-resolution quantization.

Various embodiments of the present technology employ low-resolution (or moderate resolution) quantization in the receivers without sacrificing performance. This brings significant power consumption and hardware complexity saving in the receivers. The traditional solutions for this problem lead to relatively poor performance. More precisely, using a turbo code for an AWGN channel under the constraint of one-bit quantization leads to 2 dB path loss (or channel attenuation) relative to the unquantized communication. The error correction-coding scheme described herein decreases this loss to around 0.5 dB. In fact, there is not any coding scheme that can perform well with one-bit quantization for 16-QAM. Promisingly, some embodiments provide a satisfactory performance in case of 16-QAM modulation.

Although various embodiments of the proposed coding method perform much better than state-of-the-art codes, there is still room to improve the performance of the proposed coding approach for high order modulations. This can be done by training a larger neural network at the expense of increased computational complexity. Some embodiments of the error correction code method can also be used for other challenging environments that introduce nonlinearity to the AWGN channels via phase noise and interference.

Some embodiments provide improved reliability for receivers equipped with low-bit (e.g., one-bit) or moderate-bit ADCs. For instance, some embodiments of the deep learning-based error correction coding scheme leads to 0.5 dB path loss (or channel attenuation), which is close to the performance of the turbo coded unquantized communication for QSPK modulation, and gives a similar waterfall slope with a nearly fixed signal-to-noise ratio (SNR) loss with respect to the turbo code that processes ideal unquantized samples for 16-QAM. The error correction-coding scheme described herein is robust as it has tolerance to nonlinearity in the transmitters and/or receivers.

Various embodiments of the present disclosure provide for a wide range of technical effects, advantages, and/or improvements to computing systems and components. For example, various embodiments include one or more of the following technical effects, advantages, and/or improvements: 1) while near-optimum hand-crafted channel codes, which can be equivalently obtained by perfectly training a special autoencoder, is not possible in practice, a novel and practical autoencoder-based channel coding scheme described herein is well-suited for receivers with low-rate quantization (e.g., one-bit quantization); 2) systems that provide reliable performance for AWGN channels under the constraint of low-bit (e.g., one-bit quantization to three-bit quantization) to moderate bit (e.g., four-bit quantization to six-bit quantization) in the receivers both for high and low order modulations; 3) efficient usage of excess bandwidth; 4) creation of a hybrid error correction code design for low resolution communications by integrating a turbo code to a specially designed and trained autoencoder; 5) some embodiments will enable high order modulations to work efficiently with one-bit ADCs in the receivers in addition to enhancing the performance of low order modulations; 6) use of unconventional and non-routine computer operations to create reliable receivers that can operate close to Shannon rate while having low hardware complexity and less power consumption; 7) changing the manner in which a receivers decode transmitted signals; and/or 8) integrated use of a deep learning-based error correction coding scheme.

In the following description, for the purposes of explanation, numerous specific details are set forth in order to provide a thorough understanding of embodiments of the present technology. It will be apparent, however, to one skilled in the art that embodiments of the present disclosure may be practiced without some of these specific details. For example, various embodiments of the hybrid code design can be extended to other challenging environments such as one-bit quantization for fading channels and high-dimensional multi-input multi-output (MIMO) channels. As another example, some embodiments may compensate for the performance loss observed in short block lengths for turbo, low-density parity-check (LDPC) and polar codes with deep learning aided methods.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

General Description

Various embodiments provide for techniques to design an optimum channel code is equivalent to learning an autoencoder. Below, the mathematical model of a communication system is presented. This model can be represented by a regularized autoencoder, where the regularization comes from the channel and RF modules. Then, it is formally proven that an optimum channel code can be obtained by perfectly training the parameters of the encoder and decoder—where "perfectly" means finding the global minimum of its loss function—of a specially designed autoencoder architecture.

However, autoencoders cannot be perfectly trained, so suboptimum training policies may be utilized in some embodiments. This is particularly true for low-resolution, e.g., one-bit quantization, which further impedes training due to its zero gradient. Hence, some embodiments use a suboptimum training method and justify its efficiency by theoretically finding the minimum required SNR level that yields almost zero detection error. Theoretically, zero detection error could be obtained if the autoencoder parameters would be trained perfectly, and proves the existence of a global minimum. The performance of a perfectly trained autoencoder may be empirically obtained due to, for example, getting stuck in a local minimum. In what follows, observing the SNRs due to suboptimum training and comparing it with the case of perfect training allows for the characterization of the efficiency.

Some embodiments provide for techniques for designing a practical coding scheme for receivers with low-resolution (e.g., one-bit) or moderate-resolution quantization receivers. Various embodiments remedy deficiencies in channel coding, specifically for low-resolution (e.g., one-bit) quantization, through an integrated novel deep learning-based coding scheme that combines turbo codes with an autoencoder. Specifically, some embodiments first suboptimally train an autoencoder, and then integrate a turbo code with this autoencoder, which acts as an implicit regularizer.

Various embodiments of the coding method may be as bandwidth efficient as just using the turbo code because the autoencoder packs the symbols intelligently by exploiting its sparsity stemming from the use of a rectified linear unit (ReLU) activation function and exploits the pulse shaping filter's excess bandwidth by using the faster-than-Nyquist transmission. Note that conventional channel codes are designed according to the traditional orthogonal pulses with symbol rate sampling and cannot take the advantage of excess bandwidth. The numerical results presented below show that various embodiments can approach the performance of a perfectly trained autoencoder. For example, some embodiments of the proposed coding scheme can compensate for the performance loss of QPSK modulation at finite block lengths due to the one-bit ADCs, and significantly improve the error rate in case of 16 QAM, in which case one-bit quantization does not usually work even with powerful turbo codes. This success is theoretically explained by showing that the autoencoder produces Gaussian distributed data for turbo decoder even if there are some nonlinearities in the transmitters/receivers that result in non-Gaussian noise.

Channel Autoencoders

Autoencoders are a special type of feedforward neural network involving an "encoder" that transforms the input message to a codeword via hidden layers and a "decoder" that approximately reconstructs the input message at the receiver side using the codeword. This does not mean that autoencoders strive to copy the input message to the output. On the contrary, the aim of an autoencoder is to extract lower dimensional features of the inputs by hindering the trivial copying of inputs to outputs. Different types of regularization methods have been proposed for this purpose based on denoising, sparsity, and contraction, which are termed regularized autoencoders. A special type of regularized autoencoder inherently emerges in communication systems, where the physical channel as well as the RF modules of transmitters and receivers behave like an explicit regularizer. This structure is referred to as a channel autoencoder, where channel refers to the type of regularization.

The mathematical model of a communication system is a natural partner to the structure of a regularized autoencoder, since a communication system has the following ingredients:

1) A message set $\{1, 2, \ldots, M\}$, in which message i is drawn from this set with probability 1/M
2) An encoder f: $\{1, 2, \ldots, M\} \rightarrow X^n$ that yields length-n (or variable-length) codewords
3) A channel p(y|x) that takes an input from alphabet X and outputs a symbol from alphabet Y
4) A decoder g: $Y^n \rightarrow \{1, 2, \ldots, M\}$ that estimates the original message from the received length-n sequence (or the symbol y output by the channel)

In regularized autoencoders, these four steps are performed as determining an input message, encoding this message, regularization, and decoding, respectively. To visualize this analogy, the conventional representation of a communication model 100 is portrayed as an autoencoder that performs a classification task in FIG. 1.

The fundamental distinction between a general regularized autoencoder and a communication system is that the former aims to learn useful features to make better classification/regression by sending messages, whereas the latter aims to minimize communication errors by designing handcrafted features (codewords). This analogy is leveraged to design efficient coding methods by treating a communication system as a channel autoencoder for a challenging communication environment, in which designing a handcrafted code is quite difficult. In this manner, some embodiments find the optimum encoder-decoder pair with coding theory in the sense of minimum probability of bit error can give the same encoder-decoder pair that is learned through a regularized autoencoder.

An autoencoder, used in various embodiments, may aim to jointly learn a parameterized encoder-decoder pair by minimizing the reconstruction error at the output. That is, $$(f_{AE}, g_{AE}) = \arg\min_{f,g} \mathcal{J}_{AE}(\theta_f, \theta_g) \tag{1}$$

where $\theta_f$ and $\theta_g$ are the encoder and decoder parameters of f: $\mathbb{R}^k \rightarrow \mathbb{R}^n$ and g: $\mathbb{R}^n \rightarrow \mathbb{R}^k$ respectively, and $$\mathcal{J}_{AE}(\theta_f, \theta_g) = \frac{1}{B}\sum_{c=1}^{B} L(s_c, g(f(s_c))), \tag{2}$$

where $s_c$ is the input training vector and B is the number of training samples. To find the best parameters that minimize the loss function, $L(s_c, g(f(s_c)))$ is defined as the negative log likelihood of $s_c$. The parameters are then trained through back-propagation and gradient descent using this loss function. The same optimization appears in a slightly different form in conventional communication theory. In this case, encoders and decoders are determined so as to minimize the transmission error probability given by $$(f^*, g^*) = \arg\min_{f,g} \epsilon(n, M), \tag{3}$$

where $$\epsilon(n,M) = \mathcal{P}\ [g(Y^n) \neq i | f(i)] \tag{4}$$

for a given n, M and signal-to-noise-ratio (SNR). Note that equation (3) can be solved either by human ingenuity or by a brute-force search. For the latter, if all possible combinations of mapping $2^k$ number of k-information bits to the $2^n$ codewords are observed by employing a maximum likelihood detection, the optimum linear block code can be found in terms of minimum probability of error. However, it is obvious that this is NP-hard. Thus, we propose an alternative autoencoder based method to solve (3).

(Theorem-1): The optimization problems in equations (1) and (3) are equivalent, i.e., they yield the same encoder-decoder pair for an autoencoder that has one-hot coding at the input layer and softmax activation function at the output layer, whose parameters are optimized by the cross entropy function.

In communication theory, solving equation (3) for a given n, M and SNR leads to the minimum probability of error, which can be achieved through maximum likelihood detection. Hence, $$\epsilon_{ml}(n, M) = \min_{f,g} \epsilon(n, M). \tag{5}$$

It is straightforward to express $$\epsilon_{ml}(n,M) = \epsilon(n,M) \tag{6}$$

when f=f* and g=g*. We need to prove that minimizing the loss function in equation (2) while solving equation (1) give these same f* and g*, that is $f^* = f_{AE}$ and $g^* = g_{AE}$.

Since the error probability is calculated message-wise instead of bit-wise in equation (4), the k-dimensional binary valued input training vector s is first encoded as a $2^k$-dimensional one-hot vector X to form the messages, which is to say that $M = 2^k$. Also a softmax activation function is used to translate the entries of the output vector $\hat{X}$ into probabilities. With these definitions, the cross entropy function is employed to train the parameters $$L(X,\hat{X}) = -\Sigma_{l=1}^{2^k} q[\hat{x}_l | X] \log(p[\hat{x}_l | X]) \tag{7}$$

Where $q[.|.]$ is the empirical conditional probability distribution and $p[.|.]$ is the predicted conditional probability distribution (or the output of the neural network).

Each output vector is assigned to only one discrete $2^k$ classes, and hence the decision surfaces are $(2^k-1)$-dimensional hyperplanes for the $2^k$-dimensional input space. That is, $$q[\hat{x}_l | X] = \begin{cases} 1 & X \in \hat{x}_l \\ 0 & o.w. \end{cases} \tag{8}$$

Substituting equation (8) in equation (7) implies that $$L(X,\hat{X}) = -\log(p[\hat{X}|X]). \tag{9}$$

It is straightforward to express that equation (9) is minimized when $\mathcal{P}\ [\hat{X}=X|X]$ is maximized (or equivalently $\mathcal{P}\ [\hat{X} \neq X|X]$ is minimized). Since $\hat{X} = g(Y^n)$ and X=i, $$\min \mathcal{P}\ [\hat{X} \neq X | X] = \epsilon_{ml}(n,M) \tag{10}$$

due to equations (4) and (5), and is the case when f=f* and g=g* because of equation (6). This implies that $$(f^*, g^*) = \arg\min_{f,g} \mathcal{P}[\hat{X} \neq X | X] = \arg\min_{f,g} L(X, \hat{X}). \tag{11}$$

By definition $$(f_{AE}, g_{AE}) = \arg\min_{f,g} L(X, \hat{X}), \tag{12}$$

and hence, $$(f^*, g^*) = (f_{AE}, g_{AE}),  \quad (13)$$

which, due to the one-to-one mapping between s and X, and ŝ and $\hat{X}$ shows that the optimization problems in equations (1) and (3) are equivalent.

More specifically, the optimization problems in equations (1) and (3) being equivalent states that a special autoencoder that is framed for the mathematical model of a communication system, which was defined in Shannon's coding theorem, can be used to obtain the optimum channel codes for any block length. This is useful, because there is not any known tool that gives the optimum code as a result of the mathematical modeling of a communication system. Shannon's coding theorem only states that there is at least one good code without specifying what it is, and only for infinite block lengths. Hence, autoencoders can in principle be used for any kind of environment to find optimum error correction codes. However, the autoencoder must be perfectly trained, which is challenging or impossible.

Quantifying Training Imperfections in Channel Autoencoders

The channel autoencoder specified above would negate the need to design sophisticated hand-crafted (also referred to herein as heuristically crafted) channel codes for challenging communication environments, if it was trained perfectly. However, training an autoencoder is a difficult task, because of the high probability of getting stuck in a local minimum. This can stem from many factors such as random initialization of parameters, selection of inappropriate activation functions, and the use of heuristics to adapt the learning rate. Handling these issues is in particular difficult for deep neural networks, which leads to highly suboptimum training and generalization error. As used herein, hand-crafted codes refer to codes that are selected intuitively or by trial and error (e.g., not computationally optimized by doing an exhaustive search over all possible codes or using machine learning).

In addition to this, there were other improvements related to better understanding of activation functions, e.g., using a sigmoid activation function hinders the training of lower layers due to saturated units at the top hidden layers. Despite these advances, there is still not any universal training policy that can guarantee to approach the global minimum, and using a suboptimum training, which usually converges to a local minimum in optimizing the loss function, is inevitable.

To quantify how well a suboptimum training approach can perform, it is desired to know the performance of the perfectly trained autoencoder. However, finding this empirically is not possible due to getting stuck in one of the local minima. Hence, various embodiments first find the minimum required SNR to have bit error probability approaching zero (in practice, less than $10^{-5}$). Such a low classification error can usually be achieved only if the parameters satisfy the global minimum of the loss function, corresponding to perfect training. Then, various embodiments can quantify the training imperfections in terms of SNR loss with respect to this minimum SNR, which serves as a benchmark.

Since one goal is to design channel codes for one-bit quantized AWGN channels, which is treated as a one-bit quantized AWGN channel autoencoder, this method is used to quantify the training performance of this autoencoder. Here, one-bit quantization allows for saving hardware complexity and power consumption for communication systems that utilize an ever-increasing number of antennas and bandwidth particularly at high carrier frequencies. In the rest of this section, the minimum required SNR level is determined for the one-bit quantized AWGN channel autoencoder in which the autoencoder can achieve zero classification error (or bit error rate) above this SNR, and then formally show there exists a global minimum and at least one set of encoder-decoder pair parameters converges to this global minimum.

Minimum SNR for Reliable Coding for One-Bit Quantized Channel Autoencoders

The encoder and decoder of the one-bit quantized AWGN channel autoencoder are parameterized via two separate hidden layers with a sufficient number of neurons (or width). To have a tractable analysis, a linear activation function is used at the encoder—whereas there can be any nonlinear activation function in the decoder—and there is a softmax activation function at the output. Since an autoencoder is trained with a global reconstruction error function, nonlinearities in the system can be captured thanks to the decoder even if the encoder portion is linear.

To satisfy the embodiments described above, one-hot coding is employed for the one-bit quantized AWGN channel autoencoder, which yields a multi-class classification. Specifically, the $i^{th}$ message from the message set {1, 2, . . . , M} is first coded to the k-bit information sequence s. Then, s is converted into X using one-hot coding, and encoded with f, which yields an n-bit codeword. Adding the noise to this encoded signal produces the unquantized received signal, which is given by $$y = \theta_f X + z, \quad (14)$$

where z is the additive Gaussian noise with zero mean and variance $\sigma^2$, and $\theta_f$ represents the encoder parameters. Here, complex signals are expressed as a real signal by concatenating the real and imaginary parts. Notice that there is a linear activation function in the encoder.

In some implementations, one-bit quantization can be applied element-wise as a sign (or signum) function. For instance, the quantized received signal can be computed as:

$$r = Q(y) = \text{sign}(y). \quad (15)$$

The one-bit quantized received signal $\hat{X} = [\hat{x}_1 \ldots \hat{x}_d]$ is processed by the decoder $g(\bullet)$ having the parameters $\theta_g$ followed by the softmax activation function, such that $\hat{x}_l = [g(r)]_l$ which leads to fact that the output vector is such that $d = 2^k$. The parameters $\theta_f$ and $\theta_g$ are trained by minimizing the cross entropy function between the input and output layer. This can be equivalently considered as minimizing the distance between the empirical and predicted conditional distributions. Following that one can obtain the estimate of ŝ from $\hat{X}$.

The mutual information between the input and output vector is equal to the channel capacity $$C = \max_{p(S)} I(s; \hat{s}). \quad (16)$$

Assuming that symbols are independent and identically distributed, $I(s;\hat{s})$ can be simplified to $$I(s;\hat{s}) \stackrel{(a)}{=} \sum_{i=1}^{k} H(s_i \mid s_{i-1}, \ldots, s_1) - \sum_{i=1}^{k} H(s_i \mid s_{i-1}, \ldots, s_1, \hat{s}_1, \ldots, \hat{s}_k) \quad (17)$$

$$\stackrel{(b)}{=} \sum_{i=1}^{k} H(s_i) - \sum_{i=1}^{k} H(s_i \mid \hat{s}_i)$$

$$\stackrel{(c)}{=} kI(s_i; \hat{s}_i)$$

where (a) is due to chain rule, (b) is due to independence and (c) comes from the identical distribution assumption. The capacity of the one-bit quantized AWGN channel autoencoders can then be determined as $$C = \lim_{k \to \infty} \sup \frac{1}{k} I(s;\hat{s}) = \max_{p(S)} I(s_i; \hat{s}_i). \quad (18)$$

It is not analytically tractable to express $I(s_i; \hat{s}_i)$ in closed-form due to the decoder that yields non-Gaussian noise. However, equation (16) can be equivalently expressed by replacing $I(s;\hat{s})$ with $I(s;r)$ thanks to the data processing inequality, which qualitatively states that clever manipulations of data cannot enhance the inference, i.e., $I(s;\hat{s}) \leq I(s;r)$.

The mutual information between s and r in the case of a one-bit quantized channel autoencoder satisfies the inequality:

$$I(s;r) \leq n \mathbb{E}_{\theta_f}[1 + Q(\theta_f\sqrt{\gamma})\log(Q(\theta_f\sqrt{\gamma})) + (1-Q(\theta_f\sqrt{\gamma}))\log(1-Q(\theta_f\sqrt{\gamma}))] \quad (19)$$

where $\gamma$ is the transmit SNR and $$Q(t) = \int_{t}^{\infty} \frac{1}{\sqrt{2\pi}} e^{-t^2/2} dt,$$

and where the encoder parameters are initialized with Gaussian random variables.

To see this, note that the encoder parameters $\theta_f$ can be initialized with zero-mean, unit variance Gaussian random variables in the one-bit quantized AWGN channel autoencoder. Hence, the mutual information is found over these random weights as $$I(s;r) = \mathbb{E}_{\theta_f}[I(s;r|\theta_f)]. \quad (20)$$

By the definition of mutual information, $$I(s;r) = \mathbb{E}_{\theta_f}[H(r \mid \theta_f) - H(r \mid s, \theta_f)] \quad (21)$$

$$= \mathbb{E}_{\theta_f}\left[\sum_{i=1}^{n} H(r_i \mid r_1, \ldots, r_{i-1}, \theta_f) - H(r_i \mid r_{i-1}, \theta_f) - H(r_i \mid r_1, \ldots, r_{i-1}, s, \theta_f)\right].$$

The entries of the random matrix $\theta_f$ can be independent and identically distributed (i.i.d.), and the noise samples are independent. This implies that the variables $r_i$ are independent, i.e., $$I(s;r) = n \mathbb{E}_{\theta_f}[H(r_i|\theta_f) - H(r_i|s,\theta_f)] \quad (22)$$

Since $r_i$ can be either +1 or −1 due to the one-bit quantization (e.g., using the sign function), $H(r_i) \leq 1$, which means that:

$$I(s;r) \leq n \mathbb{E}_{\theta_f}[1 - H(r_i \mid s, \theta_f)] \quad (23)$$

$$\leq n \mathbb{E}_{\theta_f}\left[1 + \sum_{s}\sum_{r_i} p[s, r_i \mid \theta_f]\log(p[r_i \mid s, \theta_f])\right]$$

$$\leq n \mathbb{E}_{\theta_f}\left[1 + \sum_{s}\sum_{r_i} p[r_i \mid s, \theta_f]p[s]\log(p[r_i \mid s, \theta_f])\right].$$

Due to the one-to-one mapping between s and X, $$I(X;r) \leq n \mathbb{E}_{\theta_f}\left[1 + \sum_{X}\sum_{r_i} p[r_i \mid X, \theta_f]p[X]\log(p[r_i \mid X, \theta_f])\right]. \quad (24)$$

Notice that for all X only one of its elements is 1, the rest are 0. This observation reduces (24) to $$I(X;r) \leq n \mathbb{E}_{\theta_f}\left[1 + \sum_{r_i} p[r_i \mid X = x, \theta_f]\log(p[r_i \mid X = x, \theta_f])\right] \quad (25)$$

Where x is one realization of X. Then, the total probability law gives $$I(x;r) \leq \mathbb{E}_{\theta_f}[1 + p[r_i = +1|x=x,\theta_f]\log(p[r_i = +1|x=x,\theta_f]) + p[r_i = -1|x=x,\theta_f]\log(p[r_i = -1|x=x,\theta_f])]. \quad (26)$$

Since $$p[r_i = +1 \mid X = x, \theta_f] = p[y_i \geq 0 \mid X = x, \theta_f] = Q(\theta_f\sqrt{\gamma}) \quad (27)$$

$$= p[y_i < 0 \mid X = x, \theta_f] = 1 - Q(\theta_f\sqrt{\gamma}),$$

showing the desired result.

It is worth emphasizing that the most common weight initialization in deep neural networks is to use Gaussian random variables. The minimum SNR $\gamma_{min}$ required for the one-bit quantized AWGN channel autoencoder can be trivially found through inequality (19) when the code rate $R = \log_2(M)/n$ is equal to the channel capacity. That is, $$\gamma_{min} = \min_{\{R=C\}} \gamma.$$

Figure 2:
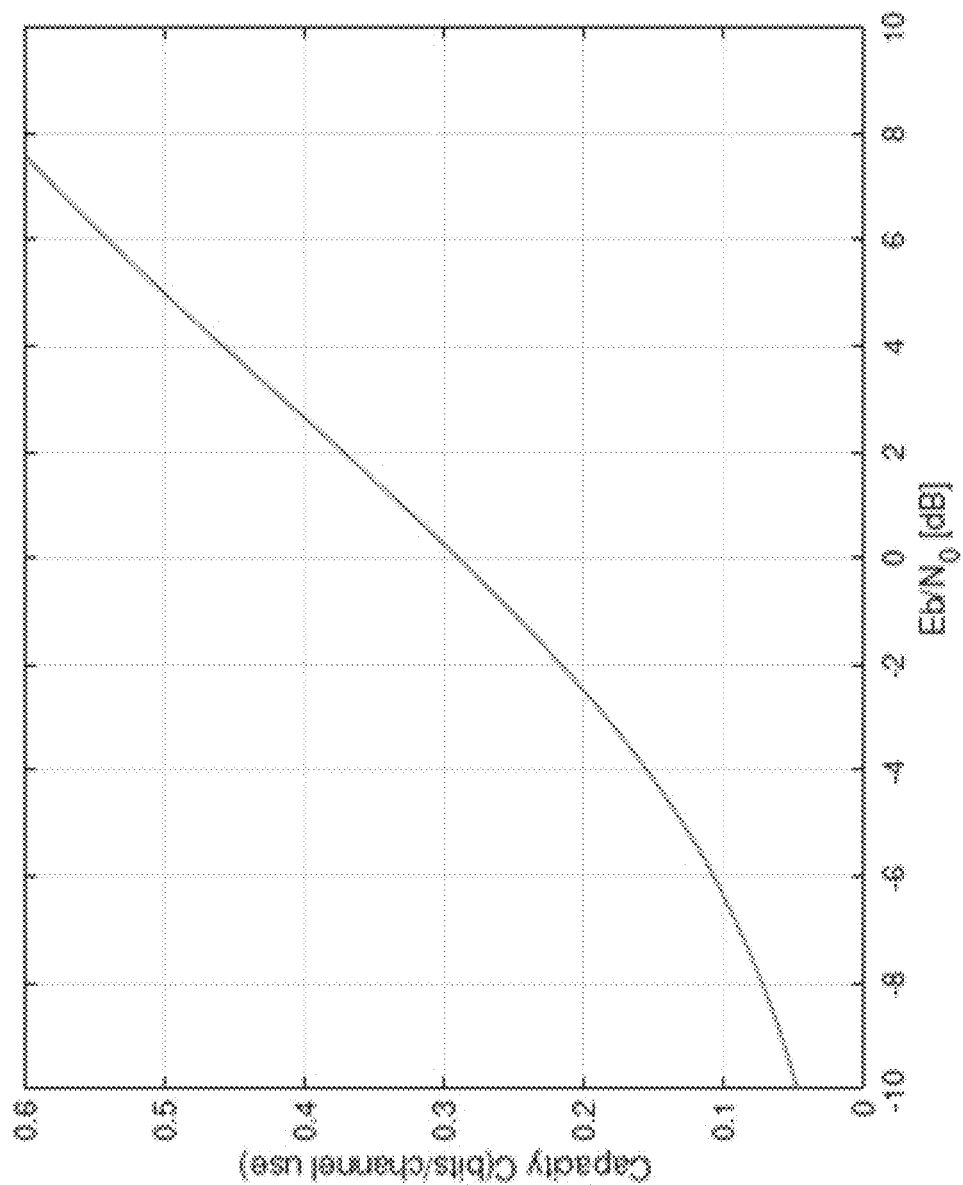
FIG. 2 is a diagram illustrating the capacity of the one-bit quantized AWGN channel autoencoders in terms of $E_b/N_0$.

The channel capacity is numerically evaluated in FIG. 2 using the mutual information formulae discussed above so as to determine the minimum SNR to suppress the regularization impact for the one-bit quantized AWGN channel autoencoder. For instance, for a code rate of ⅓, we find $\gamma_{min} = 1.051$. This means that if the one-bit quantized AWGN channel autoencoder is perfectly trained, it gives almost zero classification error above an SNR of 1.051 dB.

Existence of the Global Minimum

To achieve zero classification error above the minimum required SNR, the parameters of the encoder and decoder can be trained such that the loss function converges to the global minimum. Next, the existence of a global minimum is shown along with at least one set of encoder-decoder parameters converges to this global minimum.

For channel autoencoders, there is a global minimum and at least one set of encoder-decoder pair parameters converges to this global minimum above the minimum required SNR. To see this, note that the depth and width of the neural layers in an autoencoder are determined beforehand, and these do not change dynamically. This means that n and M—and hence the code rate—are fixed. With sufficient SNR, one can ensure that this code rate is below the capacity, in which Shannon's coding theorem guarantees reliable (almost zero error) communication. To satisfy this for the autoencoder implementation of communication systems, the necessary and sufficient conditions in the proof of Shannon's channel coding theorem must be hold, which are (i) random code selection; (ii) jointly typical decoding; (iii) no constraint for unboundedly increasing the block length.

It is straightforward to see that (i) is satisfied, because the encoder parameters are randomly initialized. Hence, the output of the encoder gives a random codeword. For (ii), equivalent optimization problems discussed above shows that the aforementioned autoencoder results in maximum likelihood detection. Since maximum likelihood detection is a stronger condition than jointly typical decoding to make optimum detection, it covers the condition of jointly typical decoding and so (ii) is satisfied as well. For the last step, there is not any constraint to limit the width of the encoder layer. This means that (iii) is trivially met. Since channel autoencoders satisfy the Shannon's coding theorem, which states there is at least one good channel code to yield zero error communication, there exists a global minimum that corresponds to the zero error communication, which can be achieved with at least one set of encoder-decoder parameters.

It is not easy to converge to encoder-decoder parameters that result in a global minimum due to the difficulties in training deep networks as mentioned previously. Additionally, the required one-hot coding in the architecture exponentially increases the input dimension, which renders it infeasible for practical communication systems, especially for high-dimensional communication signals. Thus, more practical autoencoder architectures are needed to design channel codes for one-bit quantization without sacrificing the performance.

Practical Code Design for One-Bit Quantization

To design a coding scheme under the constraint of one-bit ADCs for AWGN channels, our approach—motivated by Theorem 1—is to make use of an autoencoder framework. Hence, the code design problem for one-bit quantized AWGN channel can be transformed to the problem of learning encoder-decoder pair for a special regularized autoencoder, in which the regularization comes from the one-bit analog-to-digital converters (ADCs) and Gaussian noise. However, the one-hot encoding required by equivalent optimization problems discussed above is not an appropriate method for high-dimensional communication signals, because this exponentially increases the input dimension while training neural networks.

Another challenge is that one-bit quantization stymies gradient based learning for the layers before quantization, since it makes the derivative 0 everywhere except at point 0, which is not even differentiable. To handle all these challenges, we propose to train a practical but suboptimum autoencoder architecture and stack it with a state-of-the-art channel code that is designed for AWGN channels, but not for one-bit ADCs. The details of this design are elaborated next. In what follows, we justify the novelty of the proposed model in terms of machine learning principles.

Autoencoder-Based Code Design

Figure 3A:
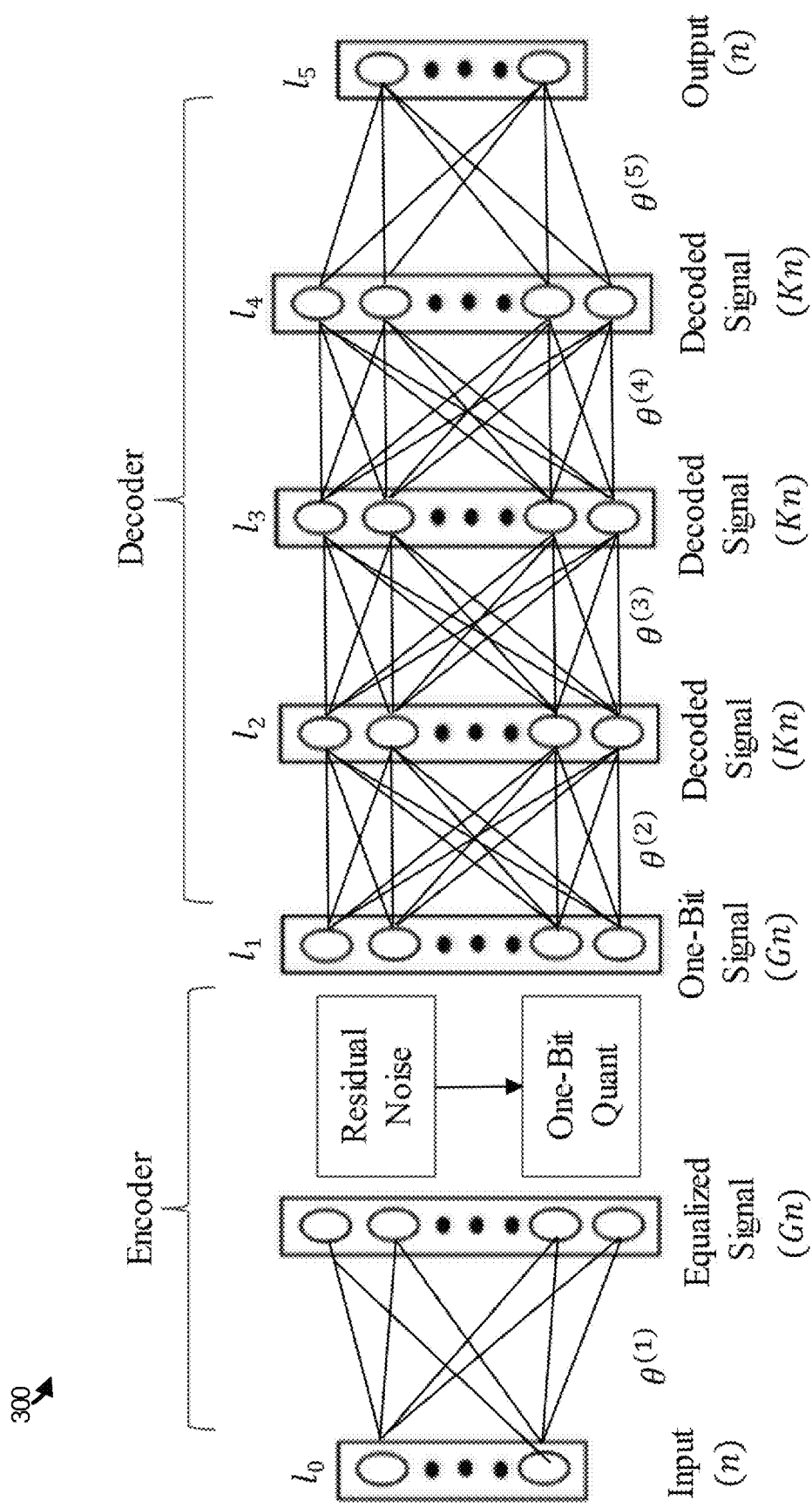
FIGS. 3A-3B illustrates an example of a one-bit quantized AWGN channel autoencoder that is trained in two-steps.
Figure 3B:
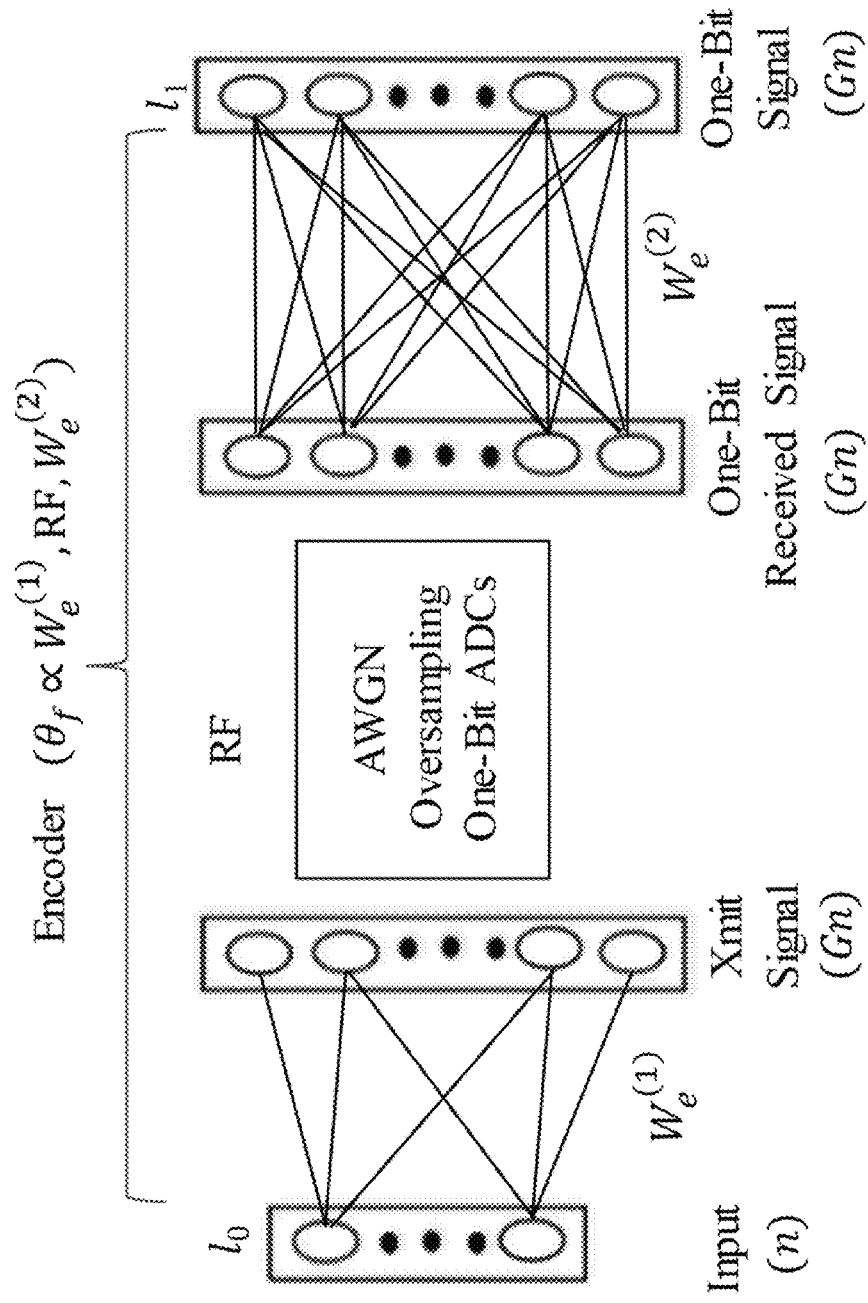

To design a practical coding scheme for one-bit quantized (or more generally, low-resolution to moderate-resolution quantized) communication, a practical (suboptimum) one-bit quantized AWGN channel autoencoder architecture can be employed. This architecture is depicted in FIG. 3A and FIG. 3B, where the encoder includes the precoder defined by the parameters $W_e^{(1)}$, the channel denoted as RF, and the equalizer defined by the parameters $W_e^{(2)}$. Note that there is a noise between the $I_0$ and $I_1$ layers that represents the noisy output of the equalizer. The equalized signal is further one-bit quantized, which corresponds to hard decision decoding, i.e., the decoder processes the signals composed of ±1. This facilitates training, which will be explained.

In this model, the binary valued input vectors can be directly fed into the encoder without doing one-hot coding. This means that the input dimension is n for n bits. The key aspect of this architecture is to increase the input dimension by G before quantization. This dimension is further increased by K/G, where K>G while decoding the signal. Although it might seem that there is only one layer for the encoder in FIG. 3A, this in fact corresponds to the two neural layers and the RF part as detailed in FIG. 3B. The encoded signal is normalized to satisfy the transmission power constraint. There decoder can include three layers with the same dimension, in which the ReLU is used for activation. (Other types of activation functions can also be used in various embodiments.) On the other hand, a linear activation function can be used at the output, and the parameters are trained so as to minimize the mean square error between the input and output layer. Additionally, batch normalization is utilized after each layer to avoid vanishing gradients. It is to be noted that since neural networks usually do not support complex arithmetic, an example implementation can include concatenating the real and imaginary part of the input, and the autoencoder or the neural network can process the resulting 2N-dimensional input vector to generate a 2G×N dimensional output vector. The output vector of the neural network can be converted back to a complex G×N vector.

The two-step training policy is used to train the aforementioned autoencoder. Accordingly, in the first step shown in FIG. 3A, the decoder parameters are trained, whereas the encoder parameters $\theta_f$ are only randomly initialized, i.e., they are not trained due to the one-bit quantization. In the second step given in FIG. 3B, the encoder parameters are trained according to the trained and frozen decoder parameters by using the stored values of $I_0$ and $I_1$ layers in the first step in a supervised learning setup. Here, the precoder in the transmitter is determined by the parameters $W_e^{(1)}$. Then, the coded bits are transmitted using a pulse shaping filter p(t) over an AWGN channel. In particular, these are transmitted with period T/G. In the receiver, the signal is processed with a matched filter p*(−t), oversampled by G, and quantized.

This RF part corresponds to faster-than-Nyquist transmission, whose main benefit is to exploit the available excess bandwidth in the communication system. Notice that this transmission method is not employed in conventional codes, because it creates inter-symbol interference and leads to non-orthogonal transmission that degrades the tractability of the channel codes. The quantized signal is further processed by a neural layer or $W_e^{(2)}$ followed by another one-bit quantization so as to obtain the same $I_1$ layer in which the decoder parameters are optimized. The aim of the second one-bit quantization is to obtain exactly the same layer that the decoder expects, which would be impossible if the $I_1$ layer became a continuous valued vector. Since the decoder part of the autoencoder processes ±1, the proposed model can be considered as having a hard decision decoder.

The one-bit quantized AWGN channel autoencoder architecture apparently violates Theorem 1 that assures the optimum coding, because neither one-hot coding nor softmax activation function is used. Additionally, ideal training is not possible due to one-bit quantization. Thus, it does not seem possible to achieve almost zero error probability in detection with this suboptimum architecture and suboptimum training even if $\gamma > \gamma_{min}$.

To cope with this problem, various embodiments may employ an implicit regularizer that can serve as a priori information. More specifically, turbo coding (or canonical coding) can be combined with the proposed autoencoder without any loss of generality, i.e., other off-the-shelf coding methods can also be used.

Figure 4:
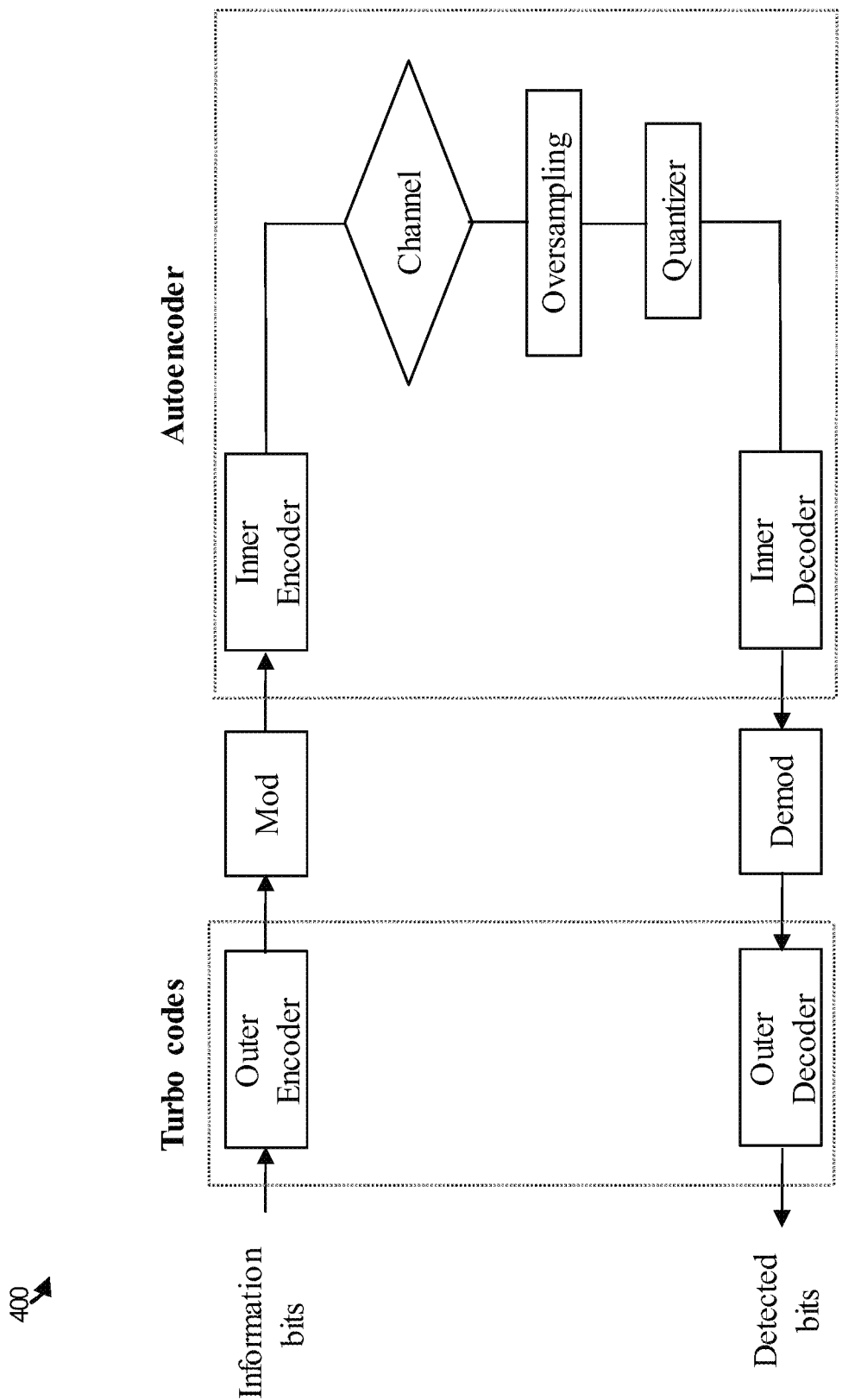
FIG. 4 is a flowchart illustrating the concatenated code for the one-bit quantized AWGN channels, in which the outer code is the turbo code but can be trivially replaced with other state-of-the-art codes such as low-density parity-check (LDPC) and Polar codes and the inner code is the autoencoder, according to various embodiments.

The proposed coding scheme for AWGN channels under the constraint of one-bit (or low to moderate) ADC is given in FIG. 4, where the outer code is the turbo code and the inner code is the one-bit quantized AWGN channel autoencoder. In this concatenated code, the outer code injects strong a priori information for the inner code. Specifically, the bits are first coded with a turbo encoder for a given coding rate and block length. Then, the turbo coded bits in one block are divided into smaller subblocks, each of which is sequentially processed (or coded) by the autoencoder. In this manner, the autoencoder behaves like a convolutional layer by multiplying the subblocks within the entire block with the same parameters.

Additionally, dividing the code block into subblocks ensures reasonable dimensions for the neural layers. It is important to emphasize that the autoencoder does not consume further bandwidth. Rather, it exploits the excess bandwidth of the pulse shaping and packs the signal more intelligently by exploiting the sparsity in the autoencoder due to using ReLU, which means that nearly half of the input symbols are set to 0 assuming that input is either +1 or −1 with equal probability. The double-coded bits (due to turbo encoder and autoencoder) are first decoded by the autoencoder. Then, the output of the autoencoder for all subblocks are aggregated and given to the outer decoder.

A concrete technical rationale for concatenating a turbo code and autoencoder is to provide Gaussian distributed data to the turbo decoder, which is optimized for AWGN and is known to perform very close to theoretical limits for Gaussian distributed data. Below we formally prove that an autoencoder centered on the channel produces conditional Gaussian distributed data for the turbo decoder as in the case of AWGN channel even if there are some significant non-linearities, such as one-bit quantization.

The conditional probability distribution of the output of the autoencoder's decoder—which is the input to the turbo decoder—conditioned on the output of the turbo encoder is a Gaussian process, despite the one-bit quantization at the front end of the receiver. To see this, note that the autoencoder architecture, which is composed of 6 layers as illustrated in FIG. 3A, can be expressed layer-by-layer as $$l_0: z^{(0)} = s, x^{(1)} = \varphi_0(z^{(0)}) = s$$

$$l_1: z^{(1)} = \theta^{(1)} x^{(1)} + b^{(1)}, x^{(2)} = Q(\varphi_1(z^{(1)}) + n^{(1)})$$

$$l_2: z^{(2)} = \theta^{(2)} x^{(2)} + b^{(2)}, x^{(3)} = \varphi_2(z^{(2)})$$

$$l_3: z^{(3)} = \theta^{(3)} x^{(3)} + b^{(3)}, x^{(4)} = \varphi_3(z^{(3)})$$

$$l_4: z^{(4)} = \theta^{(4)} x^{(4)} + b^{(4)}, x^{(5)} = \varphi_4(z^{(4)})$$

$$l_5: z^{(5)} = \theta^{(5)} x^{(5)} + b^{(5)} \quad (28)$$

where $\theta^l$ are the weights and $b^l$ is the bias. All the weights and biases can be initialized with Gaussian random variables with variances $\sigma_\theta^2$ and $\sigma_b^2$ respectively, as is standard practice. Thus, $z_i^l | x^l$ is an identical and independent Gaussian process for every $i$ (or unit) with zero mean and covariance $$K^{(l)}(z, \hat{z}) = \sigma_b^2 + \sigma_\theta^2 \mathbb{E}_{z_i^{(l-1)} \sim \mathcal{N}(0, K^{(l-1)}(x, \hat{x}))} [\sigma_{l-1}(\phi(z_i^{(l-1)})) \sigma_{l-1}(\phi(\hat{z}_i^{(l-1)}))] \quad (29)$$

Where $\sigma_{l-1}(.)$ is an identity function except for l=2 in which $\sigma_1(.) = Q(.)$. As the width goes to infinity, (29) can be written in integral form as $$\lim_{n^{(l-1)} \to \infty} K^{(l)}(z, \hat{z}) = \int \int \sigma_{l-1}(\phi_{l-1}(z_i^{(l-1)})) \sigma_{l-1}(\phi_{l-1}(\hat{z}_i^{(l-1)})) \quad (30)$$

$$\mathcal{N}\left(z, \hat{z}; 0, \sigma_\theta^2 \begin{bmatrix} K^{(l-1)}(z, z) & K^{(l-1)}(z, \hat{z}) \\ K^{(l-1)}(\hat{z}, z) & K^{(l-1)}(\hat{z}, \hat{z}) \end{bmatrix} + \sigma_b^2 \right) dz d\hat{z}.$$

To be more compact, the double integral in (30) can be represented with a function such that $$\lim_{n^{(l-1)} \to \infty} K^{(l)}(z, \hat{z}) = F_{l-1}(K^{(l-1)}(z, \hat{z})). \quad (31)$$

Hence, $z^{(5)}|s$ is a Gaussian process with zero mean and covariance $$K^{(5)}(z, \hat{z}) = F_4( \ldots (F_1(K^{(1)}(z, \hat{z})))) \quad (32)$$

when $\min(n_1, \ldots, n_5) \to \infty$, i.e., the output of the autoencoder yields Gaussian distributed data in the initialization phase.

During training, the parameters can be iteratively updated as $$\Theta_n = \Theta_{n-1} - \eta \nabla_{\Theta_{n-1}} L(\Theta_{n-1}) \quad (33)$$

where $\Theta_n = \{\theta_n^{(1)}, \ldots, \theta_n^{(5)}, b^{(1)}, \ldots, b^{(5)}\}$, and $L(\cdot)$ is the loss function. In parallel, the output $z^{(5)}$ can be updated as $$z_n^{(5)} = z_{n-1}^{(5)} + \nabla_{\Theta_{n-1}}(z_{n-1}^{(5)})(\Theta_n - \Theta_{n-1}). \quad (34)$$

The gradient term in (34) is a nonlinear function of the parameters. Nevertheless, it was recently proven that as the width goes to infinity, this nonlinear term can be linearized via a first-order Taylor expansion. More precisely, $$z_n^{(5)} = z_0^{(5)} + \nabla_{\Theta_0}(z_0^{(5)})(\Theta_n - \Theta_0) + O((\min(n_1, \ldots, n_5)^{-0.5}) \quad (35)$$

where the output at the initialization or $z_0^{(5)}$ is Gaussian as discussed above. Since the gradient (and hence the Jacobian matrix) is a linear operator, and a linear operation on a Gaussian process results in a Gaussian process, the output of the autoencoder for a given input (or $z_0^{(5)}|s$) is a Gaussian process throughout training with gradient descent.

This has important consequences, namely that even if there is a nonlinear operation in the channel or RF portion of the system, building an autoencoder around the channel provides a Gaussian distributed input to the decoder, and so standard AWGN decoders can be used without degradation. This brings robustness to the turbo codes against any non-linearity in the channel: not just quantization but also phase noise, power amplifier nonlinearities, or nonlinear interference.

The Proposed Architecture Relative to Deep Learning Principles

Choosing some initial weights and moving through the parameter space in a succession of steps does not help to find the optimum solution in high-dimensional machine learning problems. Hence, it is very unlikely to achieve reliable communication by randomly initializing the encoder and decoder parameters and training these via gradient descent. This is particularly true if there is a non-differentiable layer in the middle of a deep neural network as in the case of one-bit quantization. Regularization is a remedy for such deep neural networks whose parameters cannot be initialized and trained properly. However, it is not clear what kind of regularizer should be utilized: it is problem-specific and there is not any universal regularizer. Furthermore, it is not easy to localize the impact of regularization from the optimization.

To illustrate, in the traditional systems that successfully train a deep network for the first time by pretraining all the layers and then stacking them together, it is not well understood whether the improvement is due to better optimization or better regularization.

Utilizing a novel implicit regularization inspired by coding theory has couple of benefits. First, it is applicable to many neural networks in communication theory: it is not problem-specific. Second, the handcrafted encoder can be treated as features extracted from another (virtual) deep neural network and combined with the target neural network. This means that a machine learning pipeline can be formed by stacking these two trained deep neural networks instead of stacking multiple layers. Although it is not known how to optimally combine the pretrained layers, it is much easier to combine two separate deep neural networks. Additionally, our model isolates the impact of optimization due to the one-bit quantization. This leads to a better understanding of the influence of regularization.

In deep neural networks, training the lower layers has the key role of determining the generalization capability. In some embodiments of the model, the lower layers can be seen as layers of a virtual deep neural network that can learn the state-of-the-art coding method. The middle layers are the encoder part of the autoencoder, which are the most problematic in terms of training (due to one-bit quantization) and the higher layers are the decoder of the autoencoder. Even if the middle layers are suboptimally trained, the overall architecture performs well. That is, as long as the middle layers contribute to hierarchical learning, it is not important to optimally train their parameters. This brings significant complexity savings in training neural networks, but more work is needed to verify this claim more broadly.

One of the important observations in training the encoder is the behavior of the neural layer in the transmitter, which is the first layer in FIG. 3B. To be more precise, this layer demonstrates that nearly half of its hidden units (or neurons) become zero. This is due to the ReLU activation function and enables us to pack the symbols more intelligently. More precisely, the input of the autoencoder has N units, and thus the dimension of the first hidden layer is GN, but only GN/2 of them have non-zero terms. Interestingly, the hidden units of this layer, which also correspond to the transmitted symbols, have quite different power levels from each other.

In various embodiments of the proposed coding scheme, the symbols are transmitted faster with period T/G, however this does not affect the transmission bandwidth, i.e., the bandwidth remains the same. Although the coding rate is 1/G in the proposed autoencoder, this does not mean that there is a trivial coding gain increase, because the bandwidth remains the same, and thus the minimum distance (or free distance) does not increase. The minimum distance can even decrease despite smaller coding rate, because dividing the same subspace into G fold more partitions can decrease the distance between neighboring partitions.

One-bit ADCs can work reasonably well in practice for QPSK modulation. However, this is not the case for higher order modulation, in which it is much more challenging to have a satisfactory performance with one-bit ADCs.

Figure 5:
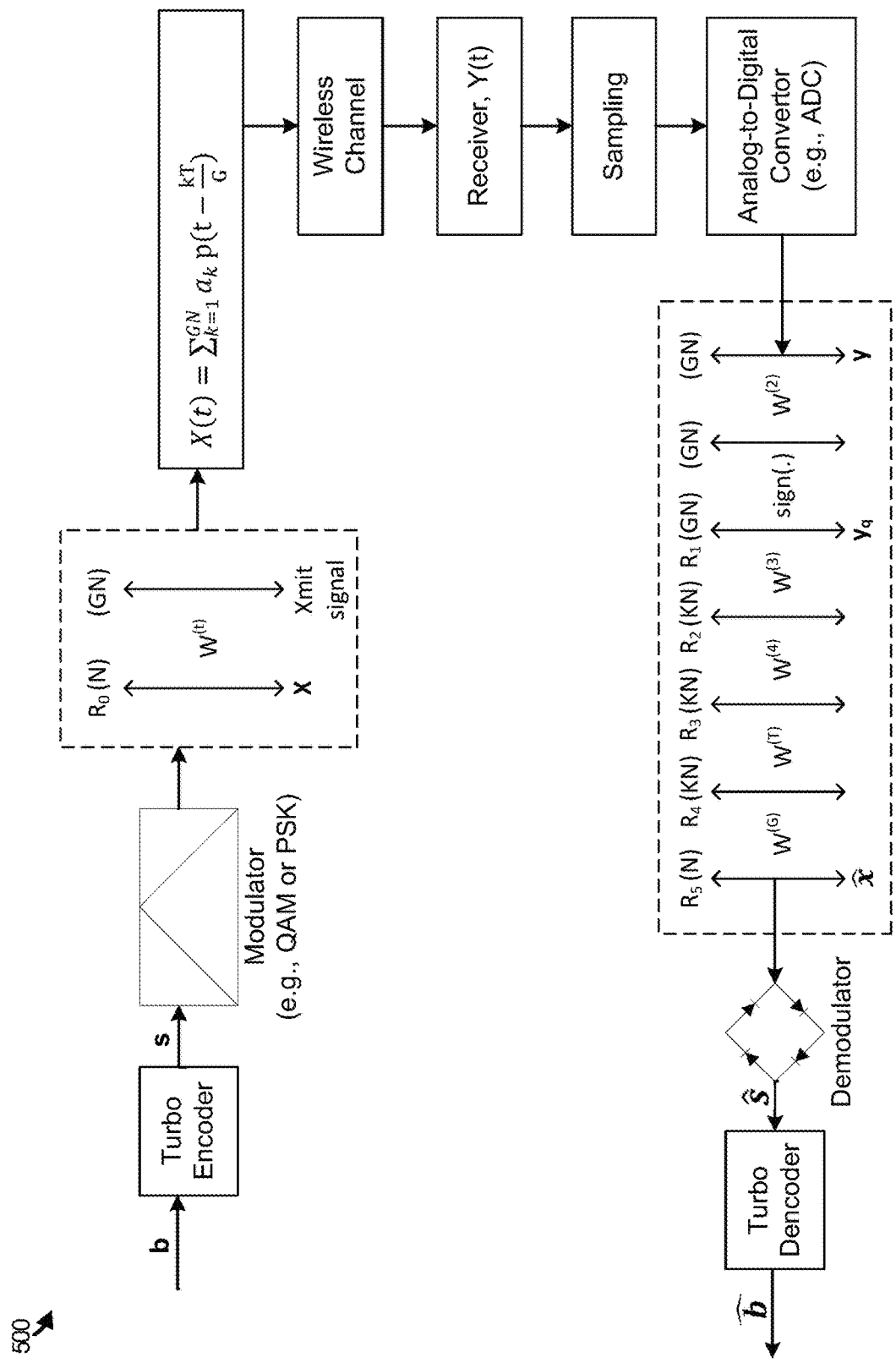
FIG. 5 is an example of the autoencoder-based error correction coding for low-resolution communication that may be used in various embodiments of the present technology.

FIG. 5 is an example of an embodiment associated with the autoencoder-based error correction coding for low-resolution communication. As illustrated in the embodiments shown in FIG. 5, a stream of information bits b, at rate R bps (e.g., which could be the output of a block code such as a Reed Solomon code) are fed into a turbo encoder. Other state of the art encoders such as Polar and LDPC codes could be used instead. The turbo encoder produces an output stream of bits sat rate R/r, where r<1 is the rate of the turbo code.

The stream s is input into a standard digital modulator, such as a quadrature amplitude modulation (QAM) or phase-shift keying (PSK) modulator, which produces complex symbols. For example, in the case of a QPSK modulator, the output symbols x will be at a rate of R/2r complex symbols per second.

The complex modulated symbols X are passed through a serial to parallel convertor to produce vectors of size N. This vector X is then passed into a neural network, specifically this is a portion of an autoencoder that resides at the transmitting device (e.g. a base station (BS) or user equipment (UE)). This neural network can have several layers, although for simplicity we should a single fully connected layer where the input vector X of size N complex symbols is the input to the neural network, operated on by weights $W^{(1)}$, and the output layer follows which has size GN complex symbols, where G>=1 is an oversampling factor. The output of the neural network at the transmitter is called X.

Some embodiments produce the transmit waveform X(t) using an oversampled digital to analog convertor with standard pulse shapes such as raised cosine pulses. This is also known as "faster than Nyquist" signaling. Specifically, X(t) can be described as $$X(t) = \sum_{k=1}^{GN} a_k p\left(t - \frac{kT}{G}\right)$$

where a is the output layer vector and $a_k$ is its $k^{th}$ element. In some implementations, the transmitter side of the autoencoder can include a pair of digital to analog convertors (DACs) communicably coupled to the neural network to process the real and imaginary parts of the complex digital signals separately.

This X(t) is then transmitted via standard radio frequency (RF) techniques over one or more antennas. It passes through a wireless channel that is characterized by multipath fading, noise and/or interference and arrives at the receiver as a modified signal Y(t).

Y(t) is oversampled i.e. the sampling period is T/G where T is the symbol period without oversampling, and then fed into an analog-to-digital convertor with low to moderate resolution. In particular, some embodiments envision a low resolution ADC where the number of bits per sample can be as low as 1 bit per complex branch (I & Q). In some implementations, the receiver side of the autoencoder can include a pair of analog-to-digital convertors (ADCs) communicably coupled to the neural network to process the real and imaginary parts of the complex baseband analog signal Y(t).

The resulting sampled and quantized signal is called y[n] and is serial to parallel converted into a vector of dimension GN, which we call y, and comprises the input vector to the neural network residing in the receiver. In particular, this is a deep neural network and the receiver portion of the whole autoencoder, where the autoencoder also includes the channel, sampling and quantization.

The vector y proceeds through L layers at the receiver, where L>=1 and are in general fully connected, although sparser connections can also be used. Each layer thus has its own weights $W^{(i)}$ where i is the layer index.

In some implementations, after the first layer with weights $W^{(2)}$, the autoencoder can further quantize an output vector of dimension GN, for example by a sign(.) function. This allows us to isolate the weights $W^{(2)}$ to be channel adaptive, which serve as a type of equalizer or channel receive filter, while not having to adapt the later weights as the channel changes. The further quantization after the first layer facilitates the training of the layers before the first layer.

This newly quantized vector $y_q$ is fed into the remainder of the neural network, which in FIG. 5 comprises four fully connected layers with weights $W^{(3)}$, $W^{(4)}$, $W^{(5)}$, and $W^{(6)}$, the first three of dimension KN, where K>G, and the output layer of dimension N, which is the same as the original input vector X at the transmitter. Since this output is meant to be as close to that original X as possible, we denote it $\hat{x}$.

$\hat{x}$ is then demodulated, which is a simple and well known operation, e.g. based on minimum distance to a defined constellation point, and then mapped to the bits corresponding to that constellation point. For example, in QPSK the vector $\hat{x}$ would have N complex symbols and produce 2N bits at the output of the demodulator.

These bits, denoted $\hat{s}$ are then fed into the turbo decoder to produce $\hat{b}$, which is the receivers estimate of the transmitted bit stream b. In some embodiments, various other standard functions are needed in order for this invention to work, such as synchronization, phase tracking, gain control, power amplification, and so on.

Figure 6:
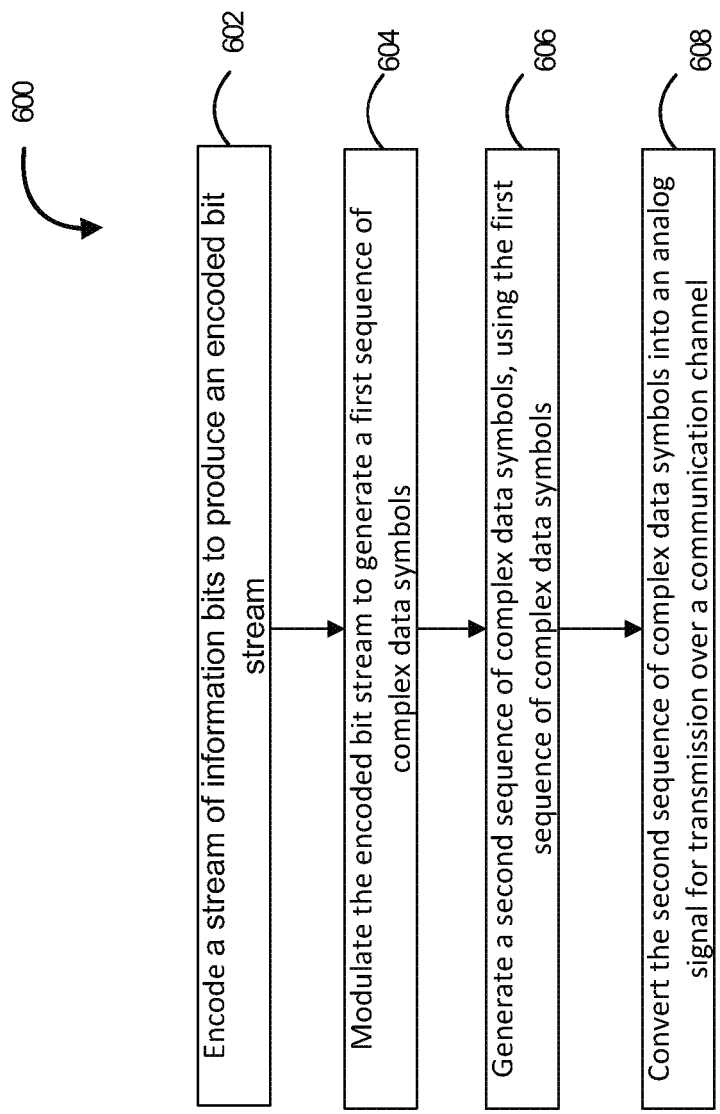
FIG. 6 is a flowchart illustrating a method to be performed by a transmitter, according to example embodiments of the current disclosure.

FIG. 6 shows a flowchart illustrating a method 600 to be performed by a transmitter (e.g., transmitter discussed with regard to FIGS. 3A-5), according to example embodiments of the current disclosure. The method 600 can include encoding a stream of information bits to produce an encoded bit stream (STEP 602), and modulating the encoded bit stream to generate a first sequence of complex data symbols (STEP 604). The method 600 can include generating a second sequence of complex data symbols using the first sequence of complex data symbols (STEP 606), and converting the second sequence of complex data symbols into one or more analog signals for transmission over a communication channel (STEP 608).

The method 600 can include an encoder encoding the stream of information bits b to produce an encoded bit stream (STEP 602). The stream of information bits b can represent the output of a block code such as a Reed Solomon code, and can have a bit rate equal to R bps. The encoder can be a turbo encoder, polar encoder, a low-resolution parity-check (LDPC) encoder, canonical encoder or an encoder of other type. The encoder can be as discussed with regard to FIGS. 1-5.

The method 600 can include a modulator modulating the encoded bit stream produced by the encoder to generate a first sequence of complex data symbols (STEP 604). The modulator can include a QAM modulator, PSK modulator or other type of modulator. In some implementations, the modulator can receive a vector of encoded bits (e.g., vectors) of the encoded bit stream and generate a corresponding complex number (or complex data symbol). The modulator can be as discussed with regard to FIGS. 3A-5 above.

The method 600 can include a neural network, or other type of trained model, generating a second sequence of complex data symbols using the first sequence of complex data symbols (STEP 606). The second sequence of complex data symbols can be different from the first sequence of complex data symbols, and can have a dimension greater than a dimension of the first sequence of complex data symbols. For instance, the length of the second sequence of complex data symbols can be greater than the length of the first sequence of complex data symbols by a multiplicative factor equal to G, where G as discussed above can be greater than or equal to 1. The neural network can be similar to that discussed above with regard to FIGS. 3A-5. In some implementations, another type of a trained model (e.g., other than a neural network) can be used to perform the same operation of the neural network discussed above with regard to FIGS. 3A-5. In some implementations, the method 600 can include a serial to parallel converter converting the first sequence of complex data symbols into a plurality of vectors (of one or more data symbols) that are fed as input to the trained model. For each input vector, the trained model can output a corresponding output vector of complex data symbols having a length greater than or equal to (e.g., by a factor equal to G) the length of the corresponding input vector.

The method 600 can include signal generator converting the second sequence of complex data symbols into one or more analog signals for transmission over a communication channel (STEP 608). For instance, the method 600 can include a pair of digital-to-analog converters (DACs) converting real and imaginary parts of the second sequence of complex data symbols into in-phase and quadrature-phase analog waveforms that are transmitted over the communication channel. The DACs can have a low or moderate quantization resolution. For instance, the quantization resolution can be less than or equal to six bits. In some implementations, the DACs can have a one-bit quantization resolution. The analog-to-digital conversion can be as discussed above with regard to FIGS. 3A-5.

Figure 7:
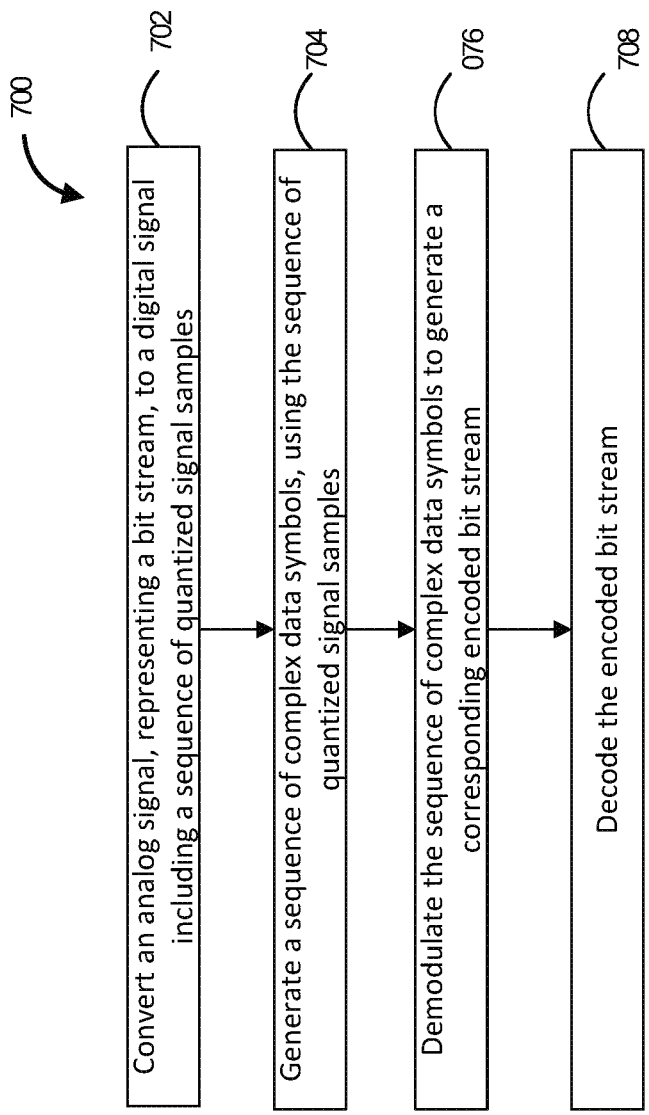
FIG. 7 is a flowchart illustrating a method to be performed by a receiver, according to example embodiments of the current disclosure.

FIG. 7 is a flowchart illustrating a method 700 to be performed by a receiver (e.g., receiver discussed with regard to FIGS. 3A-5), according to example embodiments of the current disclosure. The method 700 can include converting an analog signal, representing a bit stream, to a digital signal including a sequence of quantized signal samples (STEP 702). The method 700 can include generating a sequence of complex data symbols, using the sequence of quantized signal samples (STEP 704). The method 700 can include demodulating the sequence of complex data symbols to generate a corresponding encoded bit stream (STEP 706), and decoding the corresponding encoded bit stream (STEP 708).

The method 700 can include converting an analog signal, representing a bit stream, to a digital signal including a sequence of quantized signal samples (STEP 702). The method can include receiving the analog signal from a transmitting device via a communication channel. The analog signal can be a complex baseband analog signal including an in-phase component and a quadrature phase component. Converting the analog signal to the digital signal can include sampling the analog signal and quantizing corresponding signal samples, e.g., by an analog-to-digital ADC converter. Quantizing the signal samples can include quantizing the signal samples according to a low to moderate quantization resolution. For instance, the quantization resolution can be less than or equal to six bits. In some implementations, a pair of ADCs can quantize the real and imaginary parts (or the in-phase and quadrature-phase components) of the complex baseband analog signal separately.

The method 700 can include generating a sequence of complex data symbols using the sequence of quantized signal samples (STEP 704). The sequence of quantized signal samples can have a dimension (e.g., a length) greater than or equal to a dimension of the sequence of complex data symbols. Generating the sequence of complex data symbols can include using a neural network, as discussed with regard to FIGS. 3A-5, or other type of trained model. The neural network can be a deep neural network having a plurality of layers. In some implementations, the method 700 can include quantizing (e.g., one-bit quantization using a sign function) the output of a first layer of the neural network before feeding, as input, the output of the first layer to a second layer of the neural network. In some implementations, the method 700 can include converting the sequences of quantized signal samples into a plurality of vectors and feeding each vector as input to the neural network (or trained model). For each input vector, the neural network or trained model can generate a corresponding output vector of complex data symbols. Each output vector of the neural network (or trained model) can have dimension (e.g., length) less than or equal to the corresponding input vector, e.g., by a factor equal to G as discussed with respect to FIGS. 3A-5.

The method 700 can include demodulating the sequence of complex data symbols to generate a corresponding encoded bit stream (STEP 706), and decoding the corresponding encoded bit stream (STEP 708). Demodulating the sequence of complex data symbols can include using a QAM demodulator, a PSK demodulator or other type of demodulator. Decoding the encoded bit stream can include using a turbo decoder, polar decoder, a low-resolution parity-check (LDPC) decoder, canonical decoder or a decoder of other type. The decoding of the encoded bit stream can be as discussed with regard to FIGS. 3A-5.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A transmitter in a communication system comprising:
   an encoder to receive a stream of information bits at a rate and produce an encoded bit stream as output that adds redundancy to the stream of information bits;
   a digital modulator communicably coupled to the encoder and configured to receive the encoded bit stream from the encoder and produce complex data symbols as output;
   a neural network communicably coupled to the digital modulator and configured to receive the complex data symbols and produce an output vector using a vector of one or more of the complex data symbols, the output vector having a dimension greater than or equal to a dimension of the vector of one or more of the data symbols;
   a serial to parallel converter communicably coupled to the digital modulator and the neural network and configured to receive the complex data symbols and produce the vector of one or more of the complex data symbols, the vector of one or more of the complex data symbols is fed as input to the neural network; and one or more digital to analog convertors communicably coupled to the neural network and configured to receive the output vector, and produce an analog waveform to be transmitted over a communication channel.

2. The transmitter of claim 1, wherein the neural network includes one or more layers each associated with weights.

3. The transmitter of claim 1, wherein the digital-to-analog converter has a quantization resolution less than or equal to six bits.

4. The transmitter of claim 1, wherein the encoder is a turbo encoder, polar encoder, or a low-resolution parity-check (LDPC) encoder.

5. The transmitter of claim 1, wherein the digital modulator includes a quadrature amplitude modulation (QAM) modulator or phase-shift keying (PSK) modulator.

6. The transmitter of claim 1, wherein the neural network includes a single layer neural network or a deep neural network.

7. A method comprising:

encoding a stream of information bits to produce a corresponding encoded bit stream; modulating the corresponding encoded bit stream to generate a first sequence of complex data symbols;

converting the first sequence of complex data symbols into a plurality of first vectors of complex data symbols;

generating, using the first sequence of complex data symbols, a second sequence of complex data symbols having a dimension greater than or equal to a dimension of the first sequence of complex data symbols, the second sequence of complex data symbols different from the first sequence of complex data symbols;

generating, for each first vector, a corresponding second vector of the second sequence of complex data symbols having dimension greater than or equal to a dimension of the first vector; and converting the second sequence of complex data symbols into one or more analog signals for transmission over a communication channel.

8. The method of claim 7, wherein generating the second sequence of complex data symbols includes using a neural network having one or more layers.

\* \* \* \* \*